United States Patent
Fouillou (10) Patent No.: US 10,502,857 B2
(45) Date of Patent: Dec. 10, 2019

(54) DEVICE FOR MEASURING RESISTIVITY IN A WELLBORE

(71) Applicant: SCHLUMBERGER TECHNOLOGY CORPORATION, Sugar Land, TX (US)

(72) Inventor: Didier Fouillou, Saint Martin en Biere (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 219 days.

(21) Appl. No.: 14/974,203

(22) Filed: Dec. 18, 2015

(65) Prior Publication Data

US 2016/0178784 A1 Jun. 23, 2016

(30) Foreign Application Priority Data

Dec. 19, 2014 (EP) .................................... 14290397

(51) Int. Cl.
*G01V 3/20* (2006.01)
*E21B 47/00* (2012.01)
*G01V 3/38* (2006.01)
*G01V 13/00* (2006.01)

(52) U.S. Cl.
CPC ................. *G01V 3/20* (2013.01); *E21B 47/00* (2013.01); *G01V 3/38* (2013.01); *G01V 13/00* (2013.01)

(58) Field of Classification Search
CPC .......... E21B 47/00; G01V 13/00; G01V 3/20; G01V 3/38
See application file for complete search history.

(56) References Cited

U.S. PATENT DOCUMENTS

| | | | | |
|---|---|---|---|---|
| 3,115,602 A | | 12/1963 | Sutton et al. | |
| 4,227,151 A | * | 10/1980 | Ellis | D06F 39/004 324/441 |
| 5,574,371 A | * | 11/1996 | Tabanou | G01R 27/22 324/324 |
| 2007/0018659 A1 | * | 1/2007 | Homan | G01V 3/20 324/693 |
| 2010/0297877 A1 | * | 11/2010 | Nakamura | H01R 9/0518 439/585 |
| 2012/0209527 A1 | | 8/2012 | Gorek et al. | |

(Continued)

OTHER PUBLICATIONS

Extended European Search Report issued in equivalent European Application No. 14290397.0 dated Jul. 6, 2015 (7 pages).

*Primary Examiner* — Neel D Shah
*Assistant Examiner* — Brent J Andrews (57) ABSTRACT

The disclosure relates to a device for measuring resistivity to be mounted on a downhole tool and comprising:
a watertight body,
a first electrode and a second electrode electrically insulated from the first electrode and surrounding the first electrode, arranged in the body at a proximal end of the device,
an electrical connecting module arranged in the body and comprising a first contacting element electrically coupled to the first electrode and a second contacting element electrically coupled to the second electrode, surrounding the first contacting element, with interposition of an electrically insulating material between the first and second contacting element;
wherein the electrical connecting module projects from the body at a distal end of the device so as to form an electrical interface.

13 Claims, 4 Drawing Sheets

(56) References Cited

U.S. PATENT DOCUMENTS

2012/0265442 A1* 10/2012 Zhao ........................ G01V 3/20
                                                      702/7
2013/0293235 A1* 11/2013 Bloemenkamp ......... G01V 3/24
                                                    324/356

* cited by examiner

DEVICE FOR MEASURING RESISTIVITY IN A WELLBORE

BACKGROUND

The disclosure relates to a device for measuring resistivity adapted to be mounted on a downhole tool intended to be lowered in a wellbore.

For measuring resistivity in a wellbore, a downhole tool may comprise electrodes that generate currents into the formation surrounding the borehole and measure a current generated in the formation and a data processing module for processing, storing or transferring the measurement to the surface for instance. To ensure an accurate measurement, the electrodes are positioned so that they are on the external surface of the body of the tool and in contact with the drilling fluid present in the borehole. The data processing module is positioned in an atmospheric chamber situated inside of the tool in order to avoid exposing this module to the harsh conditions existing inside of the wellbore. The electrical signals measured by the electrodes are transferred from the electrodes to the data processing module via a coaxial cable connected to the electrodes which may generate perturbations in the signals.

SUMMARY

The disclosure relates to device for measuring resistivity for a downhole tool intended to be lowered in a wellbore and comprising a watertight body, a first electrode, a second electrode electrically insulated from the first electrode and surrounding the first electrode, arranged in the body at a proximal end of the device. It also comprises an electrical connecting module arranged in the body and comprising a first contacting element electrically coupled to the first electrode and a second contacting element electrically coupled to the second electrode, surrounding the first contacting element, with interposition of an electrically insulating material between the first and second contacting element. The electrical connecting module projects from the body at a distal end of the device so as to form an electrical interface.

It also relates to a downhole tool, comprising a collar including a housing and a device according to embodiments of the disclosure arranged in the housing. The proximal end of the device is situated outside of the collar while the distal end is situated inside of the collar. The inside and outside of the collar may be delimited by the external surface of the collar, contacting the wellbore.

It also relates to a method for manufacturing a device according to an embodiment of the disclosure, comprising electrically coupling the electrical connecting module mounted in a first body part to first and second electrodes, and overmolding a second body part on the first body part and the electrodes so that the first and second body parts form a watertight body.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In addition, the present disclosure may repeat reference numerals and/or letters in the various example implementations. This repetition is for simplicity and clarity, and does not in itself dictate a relationship between the various implementations, embodiments, and/or configurations described below.

Implementations within the scope of the present disclosure may relate generally, but not by way of limitation, to a device for measuring resistivity adapted to be mounted on a downhole tool intended to be lowered in a wellbore. This device may be mounted on a tool lowered in the wellbore by any conveyance means, such as drill string, wireline, coiled tubing, slickline, etc. However, in the following, it has been described in a drilling environment that is in no way limiting.

Figure 1:
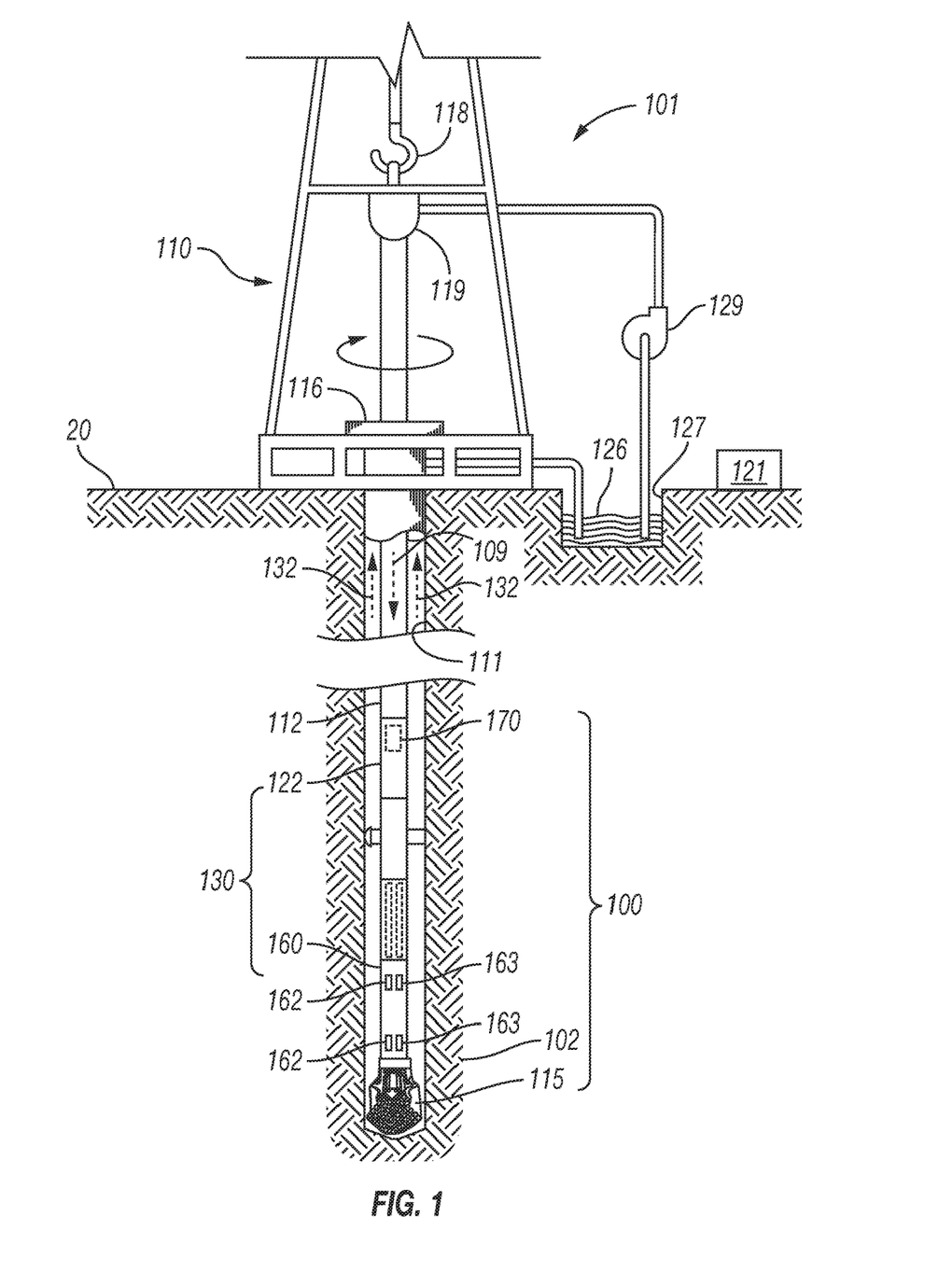
FIG. 1 is a schematic view of an environment in which a device and tool according to one or more aspects of the present disclosure may be implemented.

FIG. 1 is a schematic view of a drilling environment in which the device may be implemented according to one or more aspects of the present disclosure, onshore and/or offshore where a wellbore 111 may have been formed in the one or more subsurface formations 5 by rotary and/or directional drilling. Depicted components at wellsite 101 comprise a rig 110 and a downhole tool 100 suspended from the rig 110 within the wellbore 111 via a drill string 112. The downhole tool 100, or a bottom hole assembly ("BHA")

including the downhole tool 100, comprises or is coupled to a drill bit 115 at a lower end that is used to advance the downhole tool 100 into a subterranean formation 102 and form the wellbore 111. As depicted, the drill string 112 may include coupled sections of drill pipe and/or other conveyance means 12 suspended within the wellbore 11 and coupled to a bottom hole assembly (BHA) 100. The drill string 112 may be rotated by a rotary table 116 that engages a kelly at the upper end of the drill string 112. The drill string 112 is suspended from a hook 118, attached to a traveling block (not shown), through the kelly and a rotary swivel 119 that permits rotation of the drill string 112 relative to the hook 118. A top-drive may also be utilized to rotate and raise/lower the drill string 112, whether instead of or in addition to the kelly/rotary table 116. It will be noted that other means of conveying the BHA within the wellbore 111 may be used, such as wired drill pipe (WDP), tough logging condition (TLC) pipe, coiled tubing, and/or.

The rig 110 is depicted as a land-based platform and derrick assembly utilized to form the wellbore 111 by rotary drilling in a manner that is well known. A person having ordinary skill in the art will appreciate, however, that one or more aspects of the present disclosure may also find application in other downhole applications, such as rotary drilling, and is not limited to land-based rigs.

Drilling fluid 126 is stored in a pit 127 formed at the wellsite 101. The drilling fluid 126 may be an oil-base drilling fluid and/or other mud emulsion having a nonaqueous fluid as the external/continuous phase. However, one or more aspects of the present disclosure may also be applicable or readily adaptable to implementations in which the drilling fluid 126 is a water-base drilling fluid.

Figure 2:
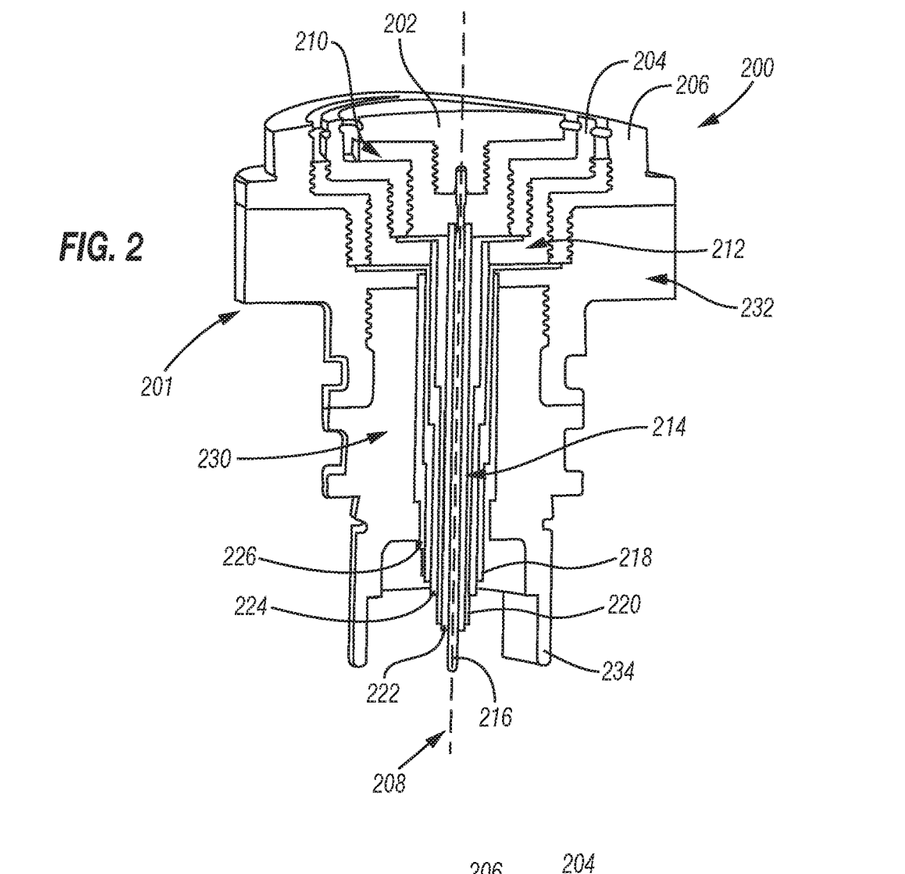
FIG. 2 is a perspective sectional view of a device according to one or more aspects of the present disclosure

A pump 129 delivers the drilling fluid 126 to the interior of the drill string 112 via a port in the rotary swivel 119, for example, such that the drilling fluid 126 flows downward through the drill string 112, as indicated in FIG. 2 by directional arrow 109. The drilling fluid 126 exits the drill string 112 via ports in the drill bit 115 (not shown), and then circulates upward through the annulus defined between the outside of the drill string 112 and the wall of the wellbore 111, as indicated by directional arrows 132. In this manner, the drilling fluid 126 lubricates the drill bit 115 and/or carries cuttings from the formation 202 up to the wellsite surface 20, where it is returned to the pit 127 for recirculation.

The BHA may include various numbers and/or types of drill collars including various downhole sensors and/or tools 160 housed therein. One or more of these downhole tools 162 may be or comprise an acoustic tool, a density tool, a directional drilling tool, a drilling tool, an electromagnetic (EM) tool, a formation evaluation tool, a gravity tool, a logging while drilling (LWD) tool, a magnetic resonance tool, a measurement while drilling (MWD) tool, a monitoring tool, a neutron tool, a nuclear tool, a photoelectric factor tool, a porosity tool, a reservoir characterization tool, a resistivity tool, a seismic tool, a surveying tool, a telemetry tool, and/or a tough logging condition (TLC) tool, although other types of sensors are also within the scope of the present disclosure.

The downhole tools may include capabilities for measuring, processing, and/or storing information, as well as for communicating with each other and/or directly with a logging and control system and/or other surface equipment 121. Such communication may utilize one or more conventional and/or future-developed one-way or two-way telemetry systems, such as may be or comprise a mud-pulse telemetry system, a WDP telemetry system, an EM telemetry system, and/or an acoustic telemetry system, among others within the scope of the present disclosure. One or more of the downhole tools may also comprise an apparatus for generating electrical power for use by one or more components of the BHA. Example devices to generate electrical power include, but are not limited to, a battery system and a turbine generator powered by the flow of the drilling fluid.

The BHA may also comprise a sampling while drilling ("SWD") system 130, which is optional.

The downhole tool 100 may comprise a module 160 including at least a resistivity sensor 162. At least some of the sensors such as the resistivity sensors may be associated and electrically connected to a data processing module 163 for processing the measures obtained by the sensor 162.

The downhole tool 100 may also comprise a downhole controller and/or control system 170 operable to communicate with the surface control equipment 121. The downhole controller and/or control system 170 may be operable to control the telemetry module 122, the SWD system 130 and/or other modules, components and/or features, such as for the extraction of fluid samples from the subterranean formation 102. It may also be connected to the data processing module 163 associated with at least some of the sensors 162. In a variant, the surface control equipment 121 may also provide a source of AC power at a selectable (radian) frequency ω for performing resistivity measurements with the sensors 162 (e.g., including electrodes) of the module 160 (e.g., including a resistivity tool) of the downhole tool 200.

Figure 3:
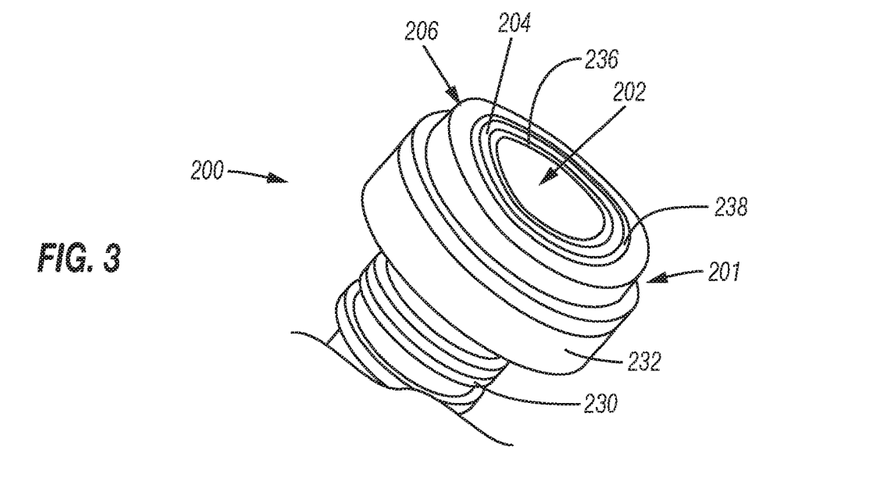
FIG. 3 is a perspective view of a proximal end of the device of FIG. 2.

A device used as a resistivity sensor 162 will now be described in reference to FIG. 2 and FIG. 3. Such a sensor is configured to operate in the wellbore in harsh conditions, including high temperature and high pressure.

The device comprises a body 201 and three electrodes 202, 204, 206 arranged in the body 201 at a proximal end of the device. The electrodes are positioned so that they are concentric, electrode 206 surrounding electrode 204 that surrounds electrode 202 relative to a reference axis 208 of the device, corresponding to a longitudinal axis of the device. Electrode 202 is designated as button electrode and is used for measuring currents generated in the formation surrounding the borehole by the tool. Electrode 204 is designated as guard or focus electrode and may enable to direct the measurements deeper in the formation. Electrode 206 may be a second guard electrode or excitation electrode. The electrical interactions between the electrodes are not discussed in more details here as it is not the aspect on which the disclosure focuses. Anyway, the device may include any electrode configuration that may enable to obtain resistivity measurement relative to the formation. For instance, the device may comprise an additional return electrode, that may inject currents into the formation and/or it may include the electrodes 202, 204 but not electrode 206.

Electrode 202 has a disk shape at the proximal end of the device while electrodes 204, 206 have a ring shape at this proximal end. Electrode arrangement is symmetric relative to a reference longitudinal axis of the device. However, electrodes may have any shape that enable to measure resistivity in the formation and the arrangement may not show any symmetry.

Electrodes are separated via electrically insulation portions 210, 212 interposed respectively between the button and focus electrode 202, 204 and the focus and focalization electrodes 204, 206. The insulation portion includes at least an insulating material.

The device 200 also includes an electrical connecting module 214 arranged in the body 201 and comprising three contacting element, including a first contacting element 216 electrically coupled to the button electrode 202 (also designated first electrode), a second contacting element 218 electrically coupled to the excitation electrode 206 (also designated second electrode) and a third contacting element 220 electrically coupled to the focus electrode 204 (also designated third electrode). The contacting elements extend along the reference axis 208 of the device. The first contacting element 216 is situated at the center of the electrical connecting module 214 and is surrounded by the third contacting module 220 with respect to the reference axis 208 which is surrounded by the second contacting module 218 with respect to the reference axis 208. In other words, the third contacting element 220 is arranged between the first and second contacting elements. The contacting elements have a general cylindrical shape.

The electrical connecting module 214 also comprises layers of electrically insulating materials 222, 224, 226 interposed respectively between the first and third contacting elements 216, 220, the third and second contacting elements 220, 218 and the second contacting element 218 and the body 201 of the device. Each of the insulating layers surrounds at least an contacting element. Each of the insulating layers 222, 224, 226 is disposed continuously between the contacting elements or between the contacting element and the body 201.

The electrical connecting module 214 projects from the body 201 of the device at a distal end of the body opposed to the proximal end with respect to reference axis 208 so as to form an electrical interface, at which the sensor may be connected with at least another external electrical component such as the data processing module 163. Each portion of the connecting module 214 projects from the body so that the closer to the center the portion is, the further it projects. In other words, the first contacting element projects further from the body 201 at the distal end than the first insulating layer 222 which projects further than the third contacting element 216, projecting further than the second insulation layer 224, projecting further than the second contacting element 216, projecting further than the third contacting portion 218. Such a configuration insulates each contacting element continuously from the others from the electrodes to the electrical interface, thereby minimizing the perturbations that may arise in the electrical signals coming from the electrode or transmitted to the electrodes.

The body 201 is a watertight body and comprises two parts 230 and 232. The first part 230 is a bulkhead constituted at least partly in a glass or ceramic or metallic material so as to seal the sensor 162 relative to the body of the drill collar. This bulkhead of the body may be electrically conductive. The bulkhead is arranged to surround the connecting module 214 and is intended to contact the drill collar. The bulkhead includes the distal end of the device. It may include a housing surrounded by a collar 234 at the distal end of the body so as to surround the electrical interface. The second part 232 of the body 201 is made of an electrically insulating material such as a plastic material, in particular a thermoplastic material that may be overmoulded on the bulkhead in order to ensure a mechanical stability of the device. However, the body of the device may be configured so as it comprises one part or more than two. The second part may also be assembled to the body by any other way and not overmoulded.

The second part of the body 232 also constitutes the insulating portions 210, 212 situated between the electrodes 202 and 204 and 204 and 206. A seal, for instance made of rubber, 236 and 238 may also be inserted or overmolded at the proximal end of the device 200 with respect to the reference axis 208 so as to optimize the insulation of the electrodes from each other. Spacings between the electrodes may be adjusted so that the impedance between the electrodes corresponds to what is expected for the targeted application and conditions of operation. Spacings between the contacting elements may also be adjusted in the same way.

The device 200 has a general cylindrical shape with a protusion formed by the electrodes at the proximal end but it may be of any appropriate shape. In this embodiment, its longitudinal dimension is about 60 mm but it can be longer or shorter depending on the specification and architecture of the downhole tool in which it will be mounted.

Figure 4:
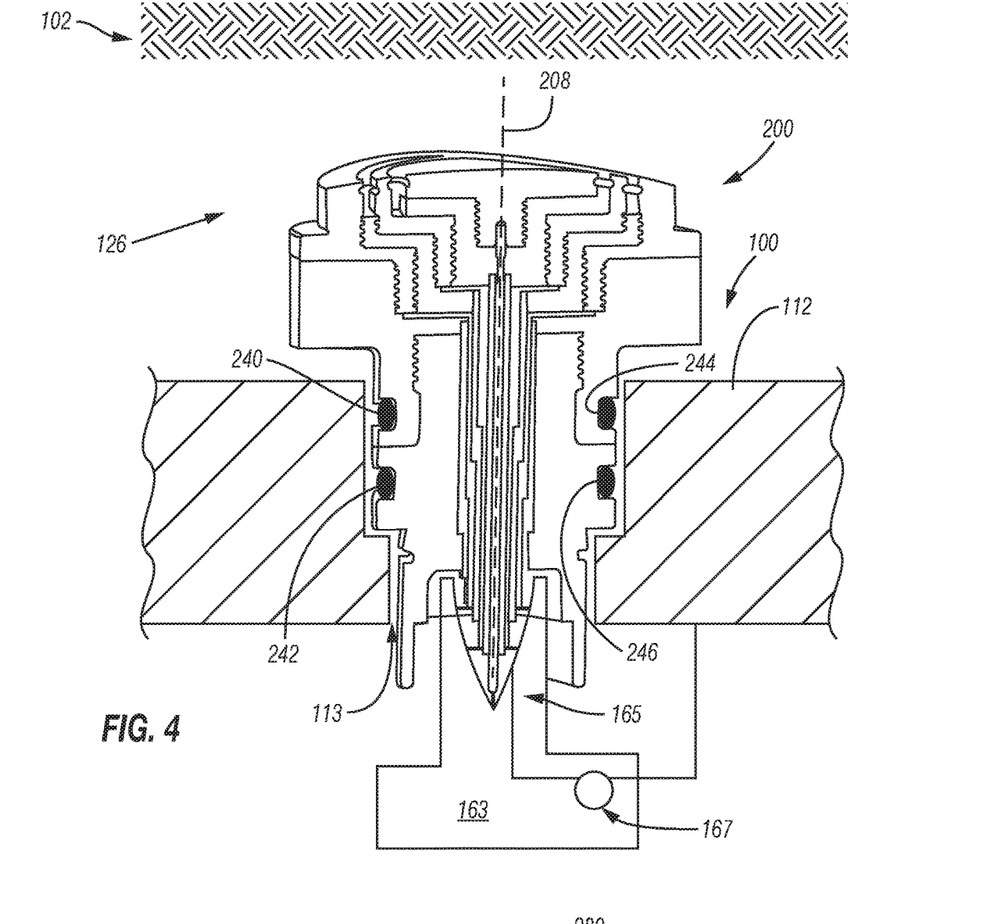
FIG. 4 is a perspective sectional view of at least a part of a downhole tool according to one or more aspects of the present disclosure

FIG. 4 is a view of a downhole tool comprising the device 200 positioned in a housing 113 of the drill collar forming part of the bottom hole assembly The device 200 is positioned inside of the drill collar 112 so as the side wall of the body and in particular of the bulkhead 230 contacts the drill collar. The reference axis 208 is then normal to the external surface of the drill collar. Seals 240, 242, for instance made of rubber, are positioned in grooves 244, 246 formed on the periphery of the side wall of the device 200 and positioned between the drill collar and the body of the device 200 such that the seals 240, 242—act as a redundant barrier to stop fluid invasion at interface between bulkhead and collar. The proximal end of the device 200 comprising the electrodes is therefore positioned outside of the drill collar in the borehole and may contact the drilling fluid 117 situated inside of the wellbore, so that they are close to the earth formation 102. The distal end is situated inside of the tool and the body 201, and more particularly the bulkhead 230 enables that tool internal components remain at atmospheric pressure. The drilling fluid may not penetrate inside of the drill collar and may not contact the distal end of the device 200.

The device may be mounted on tools with different architectures from the one that has been disclosed above. For instance, they may be mounted on a blade of a tool, flush with the collar, etc. Architecture of device may be adapted to the tool on which it is mounted. Further, the device may be mounted with the interposition of one or more additional mechanical parts.

The electrical interface formed at the distal end of the device 200 is connected to a complementary electrical interface 165 of a data processing module 163 connected to the device 200 and in particular to the electrodes. The data processing module 163 may comprise at least an external electrical component such as an electrical source 167 for generating a voltage drop between at least an electrode, for instance a focalization electrode and the drill collar, the drill collar being a return electrode of the tool in this embodiment. The electrodes and in particular the button electrode may then measure currents injected in the formation via the drill collar from which the resistivity of the earth formation may be derived.

For mounting the device 200 on the drill collar 112, the seals may be positioned on the device and then the device may be force-fitted in drill collar 112.

The downhole as disclosed here in an embodiment of the disclosure but many other embodiments may be set. For instance, the device and/or the housing may comprise an anti-rotation device for preventing the device to rotate along the reference axis relative to the drill collar. Further, the data processing module may comprise any combination of electrical components. The electrical source may for instance connect two electrodes of the device, for instance in the case when the device includes a return electrode.

Figure 5:
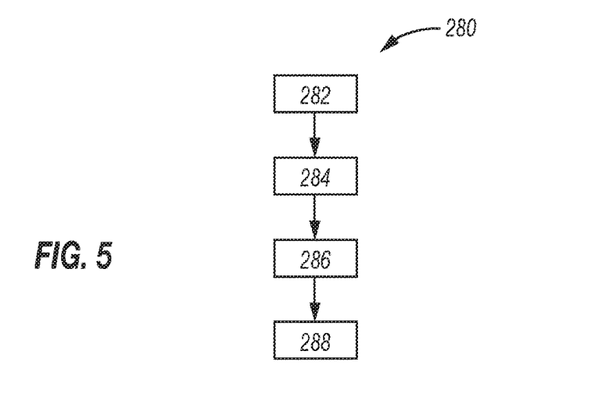
FIG. 5 is a flowchart of a manufacturing method of the device of FIG. 2
Figure 6:
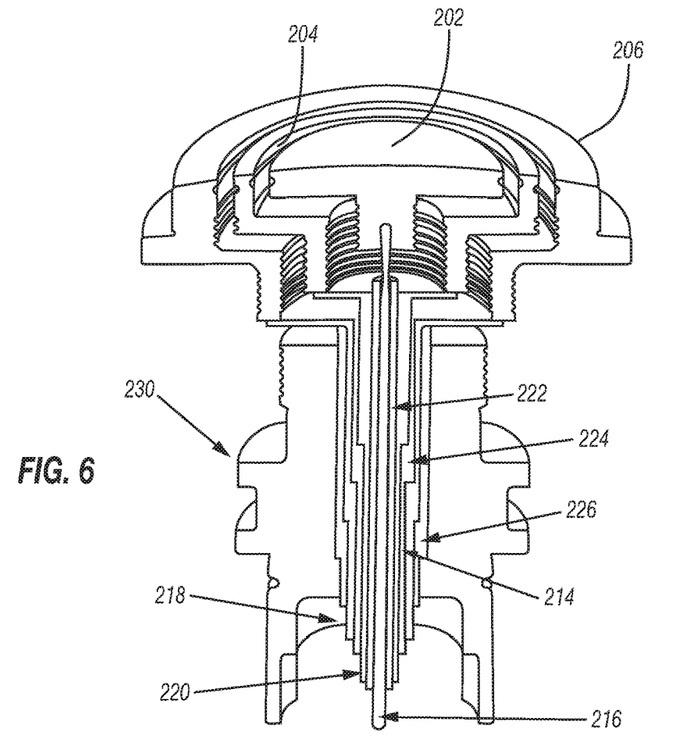
FIG. 6 is a perspective sectional view of the device of FIG. 2 during its manufacturing

FIG. 5 will now describe a manufacturing method of the device 200. The method 280 comprises positioning the electrical connecting module 214 is the first body part (or bulkhead) at a box 282. It then comprises electrically coupling the electrodes at a end of the connecting module at a box 284. The device obtained at box 284 is as shown on FIG. 6. The method then comprises overmoulding at box 286 the second part of the body 232 on the bulkhead 230 and the electrodes so that the second part of the body and the bulkhead form a watertight body and the second part of the body form the insulating portions 208, 210 between the electrodes. The method also comprises at box 288 interposing the rubber seals 236, 238 between the electrodes.

Figure 7:
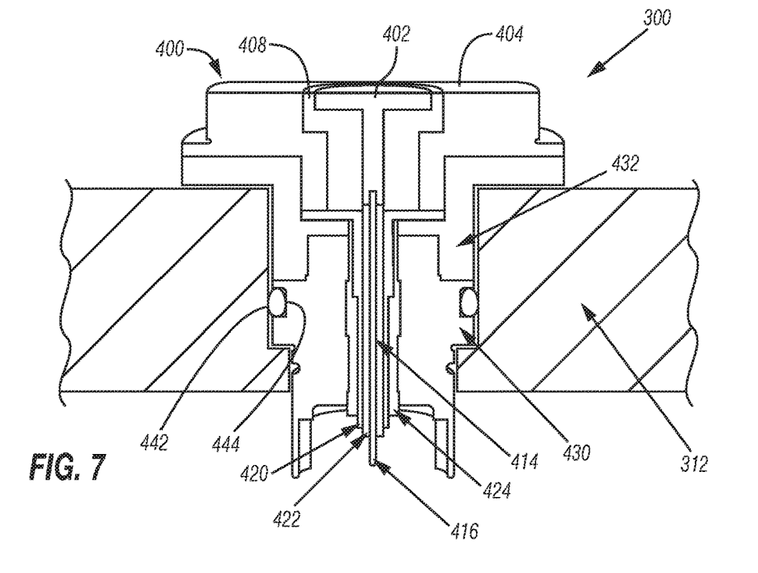
FIG. 7 is a schematic sectional view of at least a part of a downhole tool according to one or more aspects of the present disclosure

FIG. 7 is a schematic view of a part of another downhole tool 300 according to the disclosure. In this embodiment, the device 400 forms a sensor 362 and comprises two concentric electrodes 402, 404, connected to the electric connection module 414, comprising two contacting elements 416, 420. The body 401 is formed in two portions comprising a first portion 430 constituted of a ceramic material and/or metallic material for instance, and an overmolded second portion 432 constituted of an insulating material that forms the insulating portion 408 between the electrodes. The shape of the body 430 is not the same as was described before: it comprises one peripheral groove 444 on its side wall to cooperate with the drill collar 312 of the downhole tool. A rubber seal 442 is arranged in this groove.

The scope of the disclosure is not limited to the embodiments disclosed above. For instance, a downhole tool according to the disclosure may comprise a body in a unique portion, and/or having a different shape. If it comprises two portions, the second portion may be assembled to the first one by any way, like bonding, screwing, etc. Further, it may comprise more than three electrodes and/or a connection portion of different shape.

The systems and methods introduced in the present disclosure are susceptible to various modifications, variations, and/or enhancements without departing from the scope of the present disclosure. For example, different configurations can be employed for the resistivity tool to accommodate a downhole tool or other challenging environment. Accordingly, the present disclosure expressly encompasses such modifications, variations, and enhancements within its scope.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

In view of the entirety of the present disclosure, a person having ordinary skill in the art will readily recognize that the present disclosure introduces a device for measuring resistivity adapted to be mounted on a downhole tool intended to be lowered in a wellbore and comprising:
 a watertight body,
 a first electrode and a second electrode electrically insulated from the first electrode and surrounding the first electrode with respect to a reference axis of the device, arranged in the body at a proximal end of the device relative to the reference axis,
 an electrical connecting module arranged in the body and comprising a first contacting element electrically coupled to the first electrode and a second contacting element electrically coupled to the second electrode, surrounding the first contacting element with respect to the reference axis, with interposition of an electrically insulating material between the first and second contacting element;
wherein the electrical connecting module projects from the body at a distal end of the device so as to form an electrical interface.

The device may also include any of the embodiments listed below alone or in combination.

The electrical interface may be used for connecting the first and second contacting elements to an external electrical component.

The second contacting element may surround the first contacting element continuously along the reference axis between the electrode and the electrical interface.

The device may be configured to operate in the wellbore in high-pressure and/or high-temperature conditions.

The insulating material between the contacting elements may be a thermoplastic material.

An electrically insulating material may also be interposed between the second contacting element and the body.

The device may comprise a third electrode arranged at the proximal end of the device and electrically insulated from the first and second electrodes, the electrical connecting arrangement comprising a third contacting element electrically coupled to the third electrode and projecting from the body at the distal end of the device, wherein at least an electrically insulating material is interposed between the third contacting element and the adjacent contacting element(s). It may also comprise a fourth, fifth, sixth or any number of electrodes.

The electrical interface may also be configured to connect the third contacting element to an external electrical component.

One of the electrodes may be a button or measuring electrode and/or a guard or focus electrode, and/or an excitation electrode and/or a return electrode.

The contacting elements may be configured so that the first contacting element projects further from the distal end of the body than the second one.

The third electrode may be disposed between the first and the second electrodes so that the electrodes are concentric electrodes. The third contacting element may be arranged between the first and second contacting elements with interposition of an electrically insulating material on each side of the third contacting element.

The first contacting element may project further than the third one, which projects further than the second one. The closer to the center the contacting element is, the further it may project.

The body may comprise a first part arranged around the electrical connecting module and a second part arranged around the electrodes and attached to the first part. The second part may be overmolded on the first part.

The body, in particular the first part, may be at least partly constituted of a glass material, a ceramic material and/or a metallic material. In particular, the first part of the body may be made of a glass material, a ceramic material and/or a metallic material and the second part of the body made of a thermoplastic material. The second part and/or the insulating material may also be made of any other appropriate material.

At the proximal end of the device, at least a seal may be interposed between two adjacent electrodes. The seal may be made of rubber.

At least one, in particular each, of the electrodes may be forming part of a surface situated at the proximal end of the device.

The longitudinal dimension of the device, or its dimension along the reference axis, may not exceed 10 mm, in particular 60 mm.

The disclosure also introduces a downhole tool intended to be lowered in a wellbore, comprising a collar including a housing and a device as defined according to one or several of the embodiments defined hereinabove arranged in the housing such that the proximal end of the device is situated outside of the collar while the distal end is situated inside of the collar.

At least a peripheral seal may be inserted in the housing between the body of the device and the collar so that a drilling fluid present in the wellbore does not contact the distal end of the device. The seal may be made of rubber or any other appropriate material. It may be inserted between two concentric surfaces of the collar and body of the device.

A reverse movement prevention member may also be arranged outside the drill collar.

At least one of the contacting elements of the electrical interface of the device is coupled to an electrical source, for instance being part of the data processing module, the downhole tool comprising a resistivity sensor for measuring a resistivity of an earth formation surrounding the wellbore and including the electrodes of the device.*

The disclosure also introduces a manufacturing method of the device according to at least one of the embodiment as defined hereinabove, comprising:

electrically coupling the electrical connecting module mounted in a first body part to first and second electrodes, overmolding a second body part on the first body part and the electrodes so that the first and second body parts form a watertight body.

The disclosure also introduces a method for mounting a device according to at least one of the embodiment as defined hereinabove on a drill collar comprising inserting at least a peripheral seal on the body of the device and force-fitting the device with the peripheral seal into a housing of the drill collar.

The disclosure also introduces a method for measuring a resistivity of an earth formation including using a downhole tool according to any of the embodiments of the disclosure.

The invention claimed is:

1. A device for measuring resistivity adapted to be mounted on a downhole tool intended to be lowered in a wellbore and comprising:
    a watertight body,
    a first electrode, a second electrode electrically insulated from the first electrode and surrounding the first electrode with respect to a reference axis of the device, and a third electrode insulated from the first and second electrodes and disposed between the first and the second electrodes so that the electrodes are concentric electrodes, arranged in the body at a proximal end of the device relative to the reference axis, wherein the first, second and third electrodes are used to perform resistivity measurements,
    an electrical connecting module arranged in the body and comprising a first contacting element electrically coupled to the first electrode, a second contacting element electrically coupled to the second electrode and a third contacting element electrically coupled to the third electrode,
    wherein the second contacting element has a generally hollow cylindrical shape, and is configured so that it surrounds the first contacting element with respect to the reference axis, with interposition of an electrically insulating material between the first and second contacting element,
    wherein the third contacting element is arranged between the first and second contacting elements with interposition of an electrically insulating material on each side of the third contacting element, wherein the third contacting element has a generally hollow cylindrical shape, and is positioned so as to surround the first contacting element wherein the second contacting element is configured to surround the third contacting element;
    wherein the contacting elements projects from the body at a distal end of the device so as to form an electrical interface.

2. The device of claim 1, wherein an electrically insulating material is interposed between the second contacting element and the body.

3. The device of claim 1, wherein the contacting elements are configured so that the first contacting element projects further from the distal end of the body than the second one.

4. The device of claim 1, wherein the body comprises a first part arranged around the electrical connecting module and a second part arranged around the electrodes and attached to the first part.

5. The device of claim 4, wherein the second part is overmolded on the first part.

6. The device of claim 5, wherein the first part of the body is made of a glass material, a ceramic material and/or a metallic material and the second part of the body is made of a thermoplastic material.

7. A manufacturing method of the device of claim 4, comprising:
    electrically coupling the electrical connecting module mounted in a first body part to first, second and third electrodes,
    overmolding a second body part on the first body part and the electrodes so that the first and second body parts form a watertight body.

8. The device of claim 1, wherein the body is at least partly constituted of a glass material, a ceramic material and/or a metallic material.

9. The device of claim 1, wherein at the proximal end of the device, at least a seal is interposed between two adjacent electrodes.

10. The device of claim 1, wherein each of the electrodes is forming part of a surface situated at the proximal end of the device.

11. A downhole tool intended to be lowered in a wellbore, comprising a collar including a housing and a device according to claim 1 arranged in the housing such that the proximal end of the device is situated outside of the collar while the distal end is situated inside of the collar.

12. The downhole tool of claim 11, wherein at least a peripheral seal is inserted between the body of the device and the collar so that a drilling fluid present in the wellbore does not contact the distal end of the device.

13. The downhole tool of claim 11, wherein at least one of the contacting elements of the electrical interface of the device is coupled to an electrical source, the downhole tool comprising a resistivity sensor for measuring a resistivity of an earth formation surrounding the wellbore and including the electrodes of the device.

* * * * *